(12) United States Patent
Gilbert

(10) Patent No.: US 9,719,019 B1
(45) Date of Patent: Aug. 1, 2017

(54) FLAME-RETARDANT MATERIALS AND SYSTEMS

(71) Applicant: Alan M. Gilbert, McKinney, TX (US)

(72) Inventor: Alan M. Gilbert, McKinney, TX (US)

( * ) Notice: Subject to any disclaimer, the term of this patent is extended or adjusted under 35 U.S.C. 154(b) by 0 days.

(21) Appl. No.: 14/695,986

(22) Filed: Apr. 24, 2015

Related U.S. Application Data

(63) Continuation-in-part of application No. 12/434,430, filed on May 1, 2009, now Pat. No. 9,017,584, which is a continuation-in-part of application No. 11/929,670, filed on Oct. 30, 2007, now abandoned.

(60) Provisional application No. 60/855,340, filed on Oct. 30, 2006.

(51) Int. Cl.
*C09K 21/00* (2006.01)
*C09K 21/06* (2006.01)

(52) U.S. Cl.
CPC .................................. *C09K 21/06* (2013.01)

(58) Field of Classification Search
USPC ................ 424/9.52, 9.51, 489, 490; 252/605
See application file for complete search history.

(56) References Cited

U.S. PATENT DOCUMENTS

| | | | |
|---|---|---|---|
| 5,648,508 A | 7/1997 | Yaghi | |
| 5,717,001 A | 2/1998 | Books et al. | |
| 6,254,852 B1 | 7/2001 | Glajch et al. | |
| 6,617,467 B1 | 9/2003 | Muller et al. | |
| 6,624,318 B1 | 9/2003 | Muller et al. | |
| 6,893,564 B2 | 5/2005 | Mueller et al. | |
| 6,929,679 B2 | 8/2005 | Muller et al. | |
| 6,930,193 B2 | 8/2005 | Yaghi et al. | |
| 7,008,607 B2 | 3/2006 | Muller et al. | |
| 7,119,219 B2 | 10/2006 | Mueller et al. | |
| 7,169,466 B2 | 1/2007 | Taylor et al. | |
| 7,179,765 B2 | 2/2007 | Mueller et al. | |
| 7,196,210 B2 | 3/2007 | Yaghi et al. | |
| 7,202,385 B2 | 4/2007 | Mueller et al. | |
| 7,279,517 B2 | 10/2007 | Mueller et al. | |
| 9,017,584 B2 * | 4/2015 | Gilbert | ..................... C09D 5/18 252/605 |
| 2004/0097724 A1 | 5/2004 | Muller et al. | |
| 2006/0100325 A1 | 5/2006 | Leite et al. | |
| 2006/0229402 A1 | 10/2006 | Varma | |
| 2007/0140951 A1 | 6/2007 | O'Brien et al. | |

FOREIGN PATENT DOCUMENTS

WO   WO2004015016   2/2004

* cited by examiner

*Primary Examiner* — Monique Peets
(74) *Attorney, Agent, or Firm* — Mark D. Perdue

(57) ABSTRACT

A flame-retardant composition has a plurality of particles with at least one porosity therein, a flame retardant gas occupying the porosity, and a matrix material in which said particles are dispersed. A sealant applied to at least a portion of the particles, wherein the sealant substantially prevents the gas from escaping the porosities. The matrix is a flame-retardant composition adapted to be applied to various surfaces. The matrix may also function as the sealant. The sealant is formed of a material that will break down and release the gas in the presence of water or flame or other selected conditions. The sealant may be a polymer material. This solves the problem of applying flame-retardant qualities to various surfaces.

19 Claims, No Drawings

FLAME-RETARDANT MATERIALS AND SYSTEMS

RELATED APPLICATIONS

This application is a continuation-in-part of utility application Ser. No. 12/434,430, filed May 1, 2009, which is a continuation-in-part of utility application Ser. No. 11/929,670, filed Oct. 30, 2007, and claims priority to provisional Application No. 60/855,340, filed Oct. 30, 2006, all by Alan Gilbert and all entitled FLAME-RETARDANT MATERIALS AND SYSTEMS.

FIELD OF THE INVENTION

The invention relates generally to flame-retardant materials and, more particularly, to the use of porous particles to store flame-retardant, non-flammable, or oxygen displacing gases, which are applied to or stored in various materials, the stored or entrapped gas released on occurrence of selected conditions to suppress or retard flame or fire.

SUMMARY OF THE INVENTION

The invention includes a flame-retardant composition comprising a nanocube, metal organic framework or zeolite; both having a plurality of porosities formed therein; a flame-retardant material occupying the porosities; and a matrix material in which said material having a plurality of porosities are dispersed. The flame-retardant may further comprise a sealant applied to at least a portion of the material having a plurality of porosities, wherein the sealant substantially prevents the gas from escaping the porosities in the material. It may also include a composition wherein the matrix is a flame-retardant composition adapted to be applied to fabric. The invention may also include material having a plurality of porosities formed of a material that will break down and release the gas in the presence of water. The same material will also break down and release the gas in the presence of flame. The material having a plurality of porosities containing the flame-retardant material may also be sealed with a sealant that is a polymer material.

Another aspect of the invention includes a flame-retardant composition comprising a material having a plurality of porosities formed therein; an nonflammable, oxygen-displacing gas occupying the porosities; and a sealant applied to at least a portion of the material having a plurality of porosities, wherein the sealant substantially prevents the gas from escaping the porosities in the material having a plurality of porosities. This embodiment may also include a matrix that is a polymer material. This composition may include a matrix that is a flame-retardant composition adapted to be applied to a variety of substrates. This composition may include material having a plurality of porosities that are formed of a material that will break down and release the gas in the presence of water or material having a plurality of porosities formed of a material that will break down and release the gas in the presence of flame.

DETAILED DESCRIPTION

A number of unique substances known as "nanocubes" were discovered and studied at various universities around the United States. These nanocubes are of a family of organometallic (typically called metal organic frameworks or MOFs) materials that are highly crystalline, porous materials, having more free volume than most zeolites. The chemical functionality of the pores of these nanocubes or MOFs can be varied for used in storage or encapsulation of gases; thus allowing for an enormous storage capacity. One proposed stored gas is hydrogen for use as a fuel cell. One method of producing such nanocubes or MOFs is found in U.S. Pat. No. 7,119,219, issued Oct. 10, 2006, to Mueller et al. Other methods and resulting MOF structures can be found in U.S. Pat. Nos. 7,196,210; 6,930,193; and 5,648,508, all to Yaghi et al.

An example of such an existing nanocube is an isoreticular MOF that employs zinc-oxygen clusters ($Zn_4O$), which are tetrahedral clusters with the oxygen atom at the center of the tetrahedron, interconnected with benzene ring struts. Some of the benzene ring struts used have been 1,4-benzenedicarboxylate and a cyclobutyl-benzene strut. Namely, the cyclobutyl-benzene MOF has been used to encapsulate methane.

However, even with the advances in MOF or nanocube technology, applications for these substances are relatively limited. Moreover, the number of MOF substances remains relatively small (numbering less than 500). The preferred embodiment of the present invention, though, is directed toward an application of these MOFs or nanocubes, namely their use with fire-retardant compounds contained within them.

As with previously known nanocubes, the MOFs for use in flame-retardant applications include zinc-oxygen ($OZn_4$) clusters having benzene ring struts. The preferred MOF is known as MOF-177. MOF-177 is known to absorb up to 140 times its weight in gas, such as carbon dioxide ($CO_2$), at pressures between about 32 and 36 bar.

This and similar nanocubes or MOFs can be employed to contain or encapsulate or otherwise contain an oxygen displacing, non-flammable, or fire retardant gas, such as diatomic nitrogen, carbon dioxide, or argon. The gas is encapsulated by exposure of the MOF material to the gas at elevated pressure. In the case of MOF-177 and $CO_2$, a quantity of MOF particles are exposed to $CO_2$ at elevated pressure, preferably between 32 and 36 bar, thus impregnating the porous structure with a greater volume of gas than might be adsorbed at standard or ambient conditions.

Another substance exhibiting flame-retardant properties in accordance with the present invention is the zeolite. Zeolites are aluminosilicate minerals and have a microporous structure (pores smaller than 2 nm). As of January 2008, 175 unique zeolite frameworks have been identified, and over 80 naturally occurring zeolites are known. Zeolites have a porous structure (i.e., very high porosity) that can accommodate a wide variety of cations, such as $Na^+$, $K^+$, $Ca^{2+}$, $Mg^{2+}$ and others. These positive ions are rather loosely held and can readily be exchanged for others in a contact solution. Some of the more common mineral zeolites are analcime, chabazite, heulandite, natrolite, phillipsite, and stilbite. An example mineral formula is: $Na_2Al_2Si_3O_{10}\cdot 2H_2O$, the formula for natrolite.

Zeolites are the aluminosilicate members of the family of microporous solids known as "molecular sieves." The term molecular sieve refers to a particular property of these materials, i.e., the ability to selectively sort molecules based primarily on a size exclusion process. This is due to a very regular pore structure of molecular dimensions. The maximum size of the molecular or ionic species that can enter the pores of a zeolite is controlled by the dimensions of the channels. These are conventionally defined by the ring size of the aperture where, for example, the term "8-ring" refers to a closed loop that is built from 8 tetrahedrally coordinated silicon (or aluminum) atoms and 8 oxygen atoms.

Like MOFs, zeolites can be impregnated with an non-flammable, oxygen-displacing gas, such as $CO_2$, by exposure to the gas at elevated pressures, so that the porosities are filled with a greater volume of gas than might be adsorbed under standard temperature and pressure or ambient conditions. Both MOFs and zeolites are particles or particulate matter having high porosity and internal surface area capable of being impregnated with substantial volumes of gas.

Still another porous particle is halloysite, a naturally occurring aluminosilicate nanotube. Halloysite is a two-layered aluminosilicate, with a predominantly hollow tubular structure in the submicron range and chemically similar to kaolin. The size of halloysite particles varies within 1-15 microns of length and 10-150 nm of inner diameter, depending on the deposits from which it is mined.

As a "nanotube," halloysite has a single porosity. As with the MOF and zeolite, this porosity is open to the atmosphere (at at least one if not both ends) and is therefore susceptible to being impregnated with a nonflammable gas. And also as with the MOF and zeolite, at least the openings of the halloysite are sealed to prevent premature, inadvertent, or accidental release of the gas contained in the porosity.

Yet another porous particle is the compound cyclodextrin. Cyclodextrins are a family of compounds comprising saccharide (sugar) molecules bound in a ring configuration. The resulting molecular structure is a toroid or "donut" shape with a single porosity in its "middle." Like halloysite, the single porosity of cyclodextrin is open at its ends to the atmosphere and susceptible to impregnation or filling with a nonflammable gas. Also similarly, at least the openings of the cyclodextrin particle are sealed to prevent premature, inadvertent, or accidental release of the gas contained in the porosity.

As demonstrated in the Example below, the porous particles typically require treatment such as degassing and drying at temperatures elevated above ambient to maximize their ability to adsorb or be impregnated with the maximum volume of nonflammable gas. Such treatment may also facilitate the subsequent sealing of the gas-filled or impregnated particles.

The porous particles are filled or impregnated with an inert, flame-retardant gas such as $CO_2$, preferably by exposing the prepared particles to the gas in a pressurized (above ambient) environment for a time sufficient to permit the gas to permeate the pores of the particles. Other inert, nonflammable gases such as nitrogen may be appropriate, as well.

Once the gas is contained or encapsulated within the porosity of the porous particle, the particles may be sealed, preferably with a gas-impermeable polymer such as that disclosed in United States Patent Publication No. 2006-0229402, which is incorporated herein by reference. The preferred sealant must be sufficiently gas-impermeable to be capable of sealing the openings in the porosities against escape of the gas from the porosities and must be applied in such a manner as to seal the gas in the porosities. The sealant must also be chosen to dissolve or degrade under selected conditions (e.g. heat or flame or water) to permit escape of the flame-retardant gas.

For example, the sealing may occur in an elevated-pressure environment containing the inert gas by dipping or immersing the filled particles in a bath of molten or uncured sealant. Alternatively, the filled particle could be sprayed with the sealant, again preferably in an environment to prevent escape of gas prior to sealing.

The sealed porous particles may optionally be combined into a matrix, preferably a paint or polymer material, such as polyethylene, polyurethane, polystyrene, or the like. The matrix, if an appropriate (i.e., substantially gas-impermeable) material, may form the sealant, or an additional gas-impermeable sealant may be applied to the gas-impregnated particles prior to dispersion in the matrix. The sealant and matrix also can be varied so as to release the encapsulated gas under different conditions, such as the application of heat or water. Specifically, a heat-reactive matrix containing sealed, gas-containing porous particles is applied to (such as paint) or formed integrally (such as a polymer or plastic) into a substrate so that when the substrate reaches a desired temperature by exposure to heat or flame, the gas is released to extinguish or suppress the nearby flame.

As noted, in some instances, the matrix itself performs as the sealer. For example, the gas-filled particles are dispersed under conditions that retard escape of gas from the porosities in a polymer in the molten state, the polymer then being formed into an object that has flame-retardant properties. The polymer of the object then seals the porosities of the particle. Clearly, the conditions under which the otherwise unsealed, but gas-impregnated particles are dispersed in the polymer must be controlled to prevent escape of the gas and the polymer of the object must itself degrade upon encountering the selected conditions (heat, flame, water, etc.) to release the gas from the porosities in the particles.

An example of a flame-retardant application is a flame-retardant fabric, in which sealed, gas-filled or impregnated porous particles are adhered to a fabric such as for clothing. Another example of a flame-retardant application is a flame-retardant paint, in which sealed (or unsealed, if the paint contains a polymer or other material suitable for sealing the particles and the particles can be dispersed in the paint without escape of the gas) gas-filled or impregnated porous particles are dispersed in paint. Under these conditions, the binder of the paint can operate as the sealant and the matrix in which the gas-containing zeolites or MOFs are dispersed. Thus, when the paint reaches its decomposition temperature, the gas is released to extinguish or suppress the nearby flame. Alternatively, a sealant separate from the components of the paint can be employed to seal the gas in the zeolite or nanocube. The temperature at which the gas is released then can be based upon the melting or decomposition temperature of the sealant rather than the paint itself.

Yet another example of a flame-retardant application is a flame-retardant foam. In this application, the foam operates as the matrix for containing the sealed nanocubes, provided the foam is capable of sealing the gas in the porosities of the porous particles. This foam can be a polymeric or hardening foam (like polystyrene or polyurethane) operating primarily as an insulation or cushioning material or a semi-liquid or liquid form that can be dispersed onto fires. Again, the sealant can be the foam itself (in the case of a polymeric foam capable of sealing gas in the porosities of the particles and degrading on encountering selected conditions) or a separate sealant material.

Still another example of a flame-retardant application is a polymer such as polyethylene or the like in which gas-containing zeolites or MOFs are dispersed. Again, the polymer itself could serve as the sealant or a separate sealant material can be provided to retain the gas in the porosities of the zeolite or nanocube material.

EXAMPLE

A flame-retardant composition according to the present invention was prepared and tested as follows. The following materials were obtained from the following suppliers:

| Material | Vendor |
|---|---|
| Zeolite 5A (molecular sieves, powder) | Sigma-Aldrich |
| Carbon dioxide gas (high purity, 99.99%) | Olympic Inc. FastHide (latex) ultra, gloss, white paint |

An appropriate amount of zeolite 5A was degassed at 300 C under vacuum conditions overnight (12 hours) to remove any adsorbates (such as water) from the zeolite. The degassed zeolite was then cooled to room temperature under a vacuum. Carbon dioxide gas was then introduced into a flask containing the degassed zeolite for 5 hours at a pressure of 800 torr. It is estimated that approximately 10% by weight of carbon dioxide was adsorbed by the degassed zeolite 5A (for commercial production, higher pressures and different exposure times may be employed to impregnate more of the inert gas more quickly). The degassed zeolite with carbon dioxide was mixed with a quantity of the paint.

Three different 2×10 inch papers were prepared and painted as follows: Sample S1 contained only paint without zeolite; sample S2 contained 25% by weight of degassed (as above) zeolite without $CO_2$; and sample S3 was prepared with 25% by weight of $CO_2$ adsorbed zeolite (as above). Lastly, sample S4 was prepared the same way as sample S3 except the samples were left on a shelf under ambient conditions at room temperature for three weeks.

Each sample was tested with a flame propagation tester. The papers painted with only paint (S1) and with 25% by weight zeolite 5A without $CO_2$ (S2) burned within several seconds. However, carbon dioxide adsorbed zeolite 5A added samples (S3) showed drastic retardation of the flame and the fire was extinguished under the sample experimental condition. It is clear that carbon dioxide released from the zeolite at elevated temperatures in the presence of flame retards and extinguishes the fire.

To investigate the long-term stability of $CO_2$ adsorbed zeolite containing paint, the S4 samples were kept at room temperature under ambient conditions for 3 weeks as described above. S4 samples produced the same results as S3 samples, i.e., all of the S4 samples extinguished the fire upon burning.

In this example, the latex contained in the paint operated as a sealant for the porous particles. Also, the $CO_2$ was not impregnated in the to porosities at very high pressure, nor was particular care exercised in dispersing the particles in the paint. It is believed that impregnation at higher pressures, together with dispersal of the particles under impregnation pressures may result in even better results.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A flame-retardant composition comprising:
   a plurality of particles, each particle having at least one porosity therein;
   a nonflammable gas occupying the porosity at a pressure elevated above ambient conditions; and
   a gas-impermeable, polymeric sealant on each of the particles, the sealant maintaining the gas at elevated pressure in the porosity and substantially preventing escape of the gas from the porosity, the sealant breaking down to release the gas from the porosities under selected conditions, wherein the sealant is a matrix material in which the particles are dispersed.

2. The composition according to claim 1, wherein the nonflammable gas is carbon dioxide.

3. The composition according to claim 1, wherein the particles are halloysite.

4. The composition according to claim 1, wherein the particles are cyclodextrin.

5. The composition according to claim 1, wherein the sealant is a material that will break down and release the gas in the presence of heat or flame.

6. The composition according to claim 1, wherein the at least one porosity in each of the plurality of particles is open to an atmosphere and the sealant obstructs the opening to prevent escape of the gas.

7. A flame-retardant composition comprising:
   a plurality of particles, each particle having at least one porosity;
   a nonflammable, oxygen-displacing gas occupying the porosity at a pressure elevated above ambient conditions; and
   a gas-impermeable, polymer sealant applied to at least a portion of each of the particles, wherein the sealant substantially prevents the gas from escaping the porosity in each particle until exposure to heat or flame.

8. The composition according to claim 7, wherein the sealant is a matrix material in which the particles are dispersed.

9. The composition according to claim 7, wherein the nonflammable gas is carbon dioxide.

10. The composition according to claim 7, wherein the particles are halloysite.

11. The composition according to claim 7, wherein the particles are cyclodextrin.

12. The composition according to claim 7, wherein the sealant is a material that will break down and release the gas in the presence of heat or flame.

13. The composition according to claim 7, wherein the at least one porosity in each of the plurality of particles is open to an atmosphere and the sealant obstructs the opening to prevent escape of the gas.

14. A flame-retardant composition comprising:
   a plurality of particles, each particle having at least one porosity, each porosity having at least one open end;
   a nonflammable, oxygen-displacing gas occupying the porosity at a pressure elevated above ambient conditions; and
   a gas-impermeable, polymer sealant applied to at least a portion of each of the particles, wherein the sealant obstructs the open end of the porosity and substantially prevents the gas from escaping the porosity in each particle until exposure to heat or flame.

15. The composition § according to claim 14, wherein the sealant is a matrix material in which the particles are dispersed.

16. The composition according to claim 14, wherein the nonflammable gas is carbon dioxide.

17. The composition according to claim 14, wherein the particles are halloysite.

18. The composition according to claim 14, wherein the particles are cyclodextrin.

19. The composition according to claim 14, wherein the sealant is a material that will break down and release the gas in the presence of heat or flame.

\* \* \* \* \*